July 21, 1936.  M. MOFFETT  2,048,459
STAPLE MAKING MACHINE
Filed June 12, 1935  6 Sheets—Sheet 1

Fig.1

INVENTOR
*Myrtha Moffett*
BY
ATTORNEY

July 21, 1936.                M. MOFFETT                2,048,459
                          STAPLE MAKING MACHINE
                          Filed June 12, 1935           6 Sheets-Sheet 3

Fig. 3

INVENTOR
Myrtha Moffett
BY
ATTORNEY

July 21, 1936.  M. MOFFETT  2,048,459
STAPLE MAKING MACHINE
Filed June 12, 1935    6 Sheets—Sheet 4

INVENTOR
Myrtha Moffett
BY
ATTORNEY

Fig. 7

Patented July 21, 1936

2,048,459

UNITED STATES PATENT OFFICE 2,048,459

STAPLE MAKING MACHINE

Myrtha Moffett, Fresno, Calif.

Application June 12, 1935, Serial No. 26,163

21 Claims. (Cl. 140—82)

This invention relates to automatic staple making machinery, and particularly to a machine for making staples of the special form as shown in my Patent No. 1,903,830, dated April 18, 1933, for use with the tool shown in said patent in connection with fence making or repairing operations.

These staples are U-shaped members with the legs bent over at their base so that the finished staple is of substantially hook shaped form.

The principal object of my invention is to provide an automatic machine by means of which an initially straight and continuous wire will be successively cut to lengths suitable for the staples, bent to the proper U-shaped form, and then again bent over to provide the hook portion, all in a continuous sequence and without any manual or other handling of the wire or the partially formed staples being required from start to finish of the operations.

The machine is constructed so as to turn the staples out very rapidly, from 3500 to 4000 per hour being an average output. Another object is to construct the machine so that there are no delicate parts to get out of order and the likelihood of any pieces of wire or partly formed staples becoming jammed in the machine, or being turned out in distorted form, is negligible.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 6:
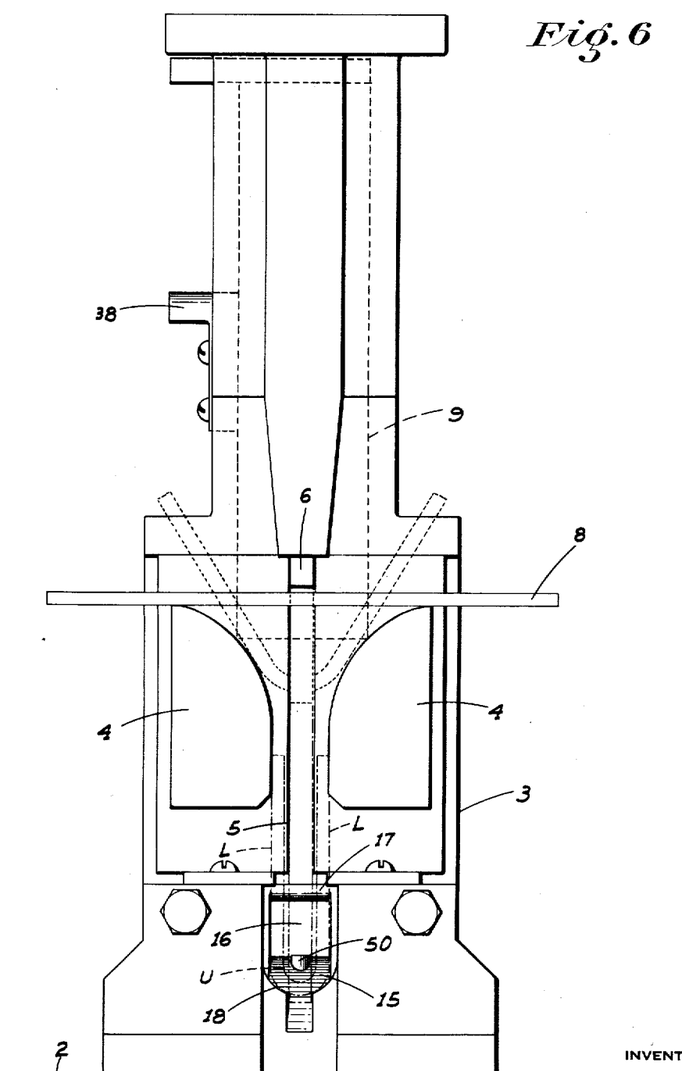
Figure 6 is a front elevation of the initial wire bending unit, detached from the remainder of the machine.

Referring now more particularly to the characters of reference on the drawings, the machine comprises a rigid main frame 1 of suitable form which supports a horizontal plate or table 2. Mounted on and upstanding from the plate 2 is an auxiliary frame 3, the front face of which is substantially flat and of plate-like form and extends lengthwise of the machine relative to the direction of advancing movement of the wire, as hereinafter described. This frame has on its front face and intermediate its ends a pair of spaced wire bending guide plates 4, or fixed formers, whose upper edges curve downwardly and toward each other from their opposite top corners, as shown in Figure 6. The spacing between these plates is the same as the overall width between the legs of the staple to be formed.

Projecting through the front face of the frame 3 and slidable in a vertical slot 5 extending centrally between the plates 4 from above the same to a point near the bottom of said frame, is a relatively narrow plunger 6, curvedly recessed at its lower end as at 7 to smoothly engage and bend a wire 8 resting on the plate 4 and bridging the space therebetween. The supporting cross head 9 of the plunger projects from the back side of the same and extends to the outer or back face of the frame 3, being slidably guided in said frame for vertical movement and its lower end being above the bottom of the plunger.

The cross head outwardly of the frame 3 is provided with a boss 10 to which the upper end of a connecting rod 11 is pivoted. At its lower end said rod is connected in crank or eccentric relation to a shaft 12 which extends lengthwise of the main frame 1 below the plate 2 and is driven by and at the same speed as another shaft 12a parallel thereto. This shaft 12a in turn is driven at a suitable speed and by suitable driving connections 13 from an electric motor 14.

Figure 2:
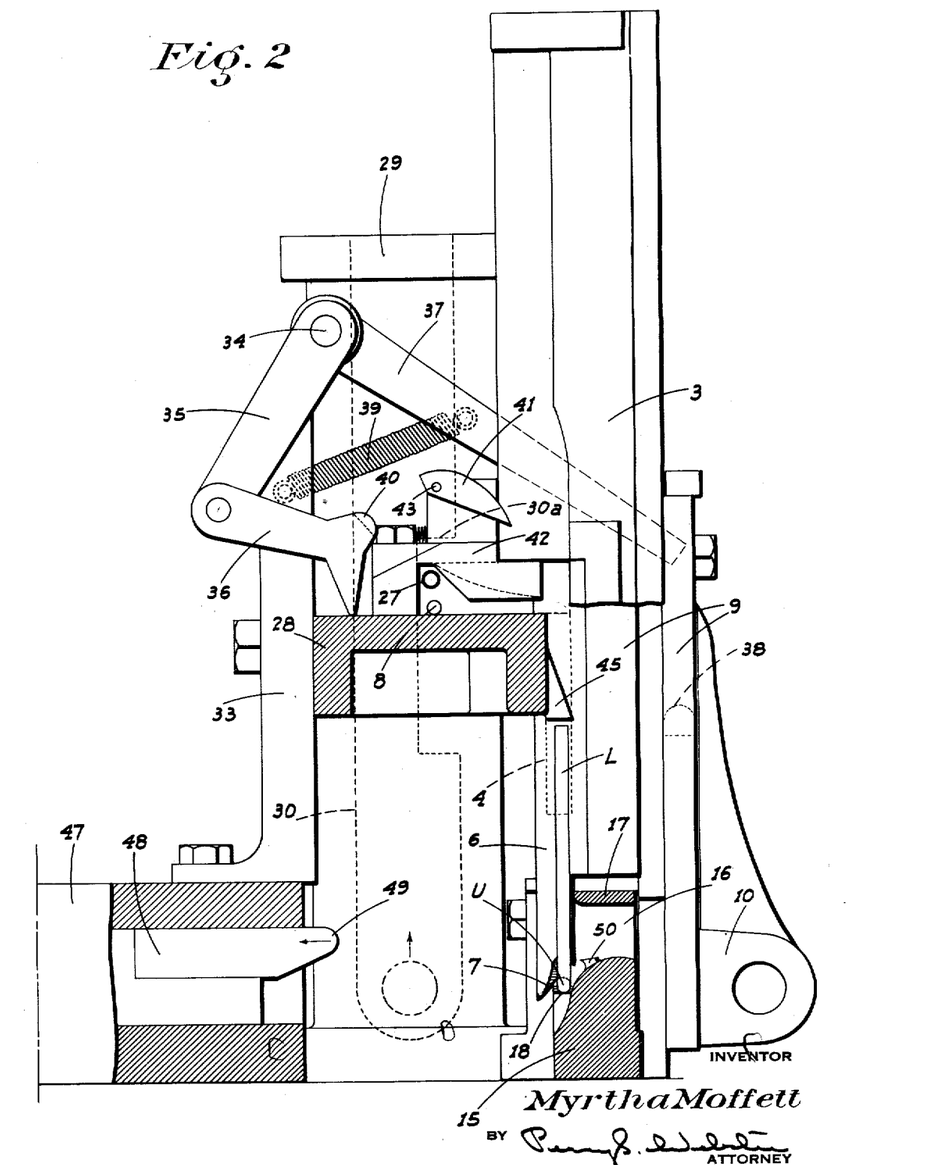
Figure 2 is a full-size fragmentary transverse view partly in section of the machine showing said plunger in the position of Figure 1.

The stroke of the crank and rod are sufficient to move the plunger 6 from a point above the top of the plates 4 to a bottom termination in front of and below the upper end of a convexly curved abutment 15. This abutment projects downwardly from a vertically extending opening 16 formed in the frame 3 in a plane centrally between the plates 4, and the width of which is the same as the spacing between said plates. The top of the opening is formed by a horizontal stop plate or abutment 17 disposed just back of the plunger, as shown in Figure 2; the cross head 9 when at the bottom of its stroke being just above said stop 17.

With this arrangement therefore, if a length of wire is disposed upon the plates 4 in bridging relation to the space therebetween, as shown in Figure 6, and the plunger 6 is then depressed from above the wire, the wire will be increasingly bent as the plunger descends; the wire contacting with and following the curved sides of the former plates 4. With the descent of the plunger to its lowest position, which is some distance below the plates 4, the wire is bent to a U-shaped form with parallel legs L, the bend U of the wire finally resting in a cradle 18 of similar contour formed at the front of the abutment 15.

Since the wire is naturally somewhat resilient the upper portions of the legs of the bent wire tend to remain in frictional contact with the sides of the former plates, as indicated in Figure 6.

Figure 7:
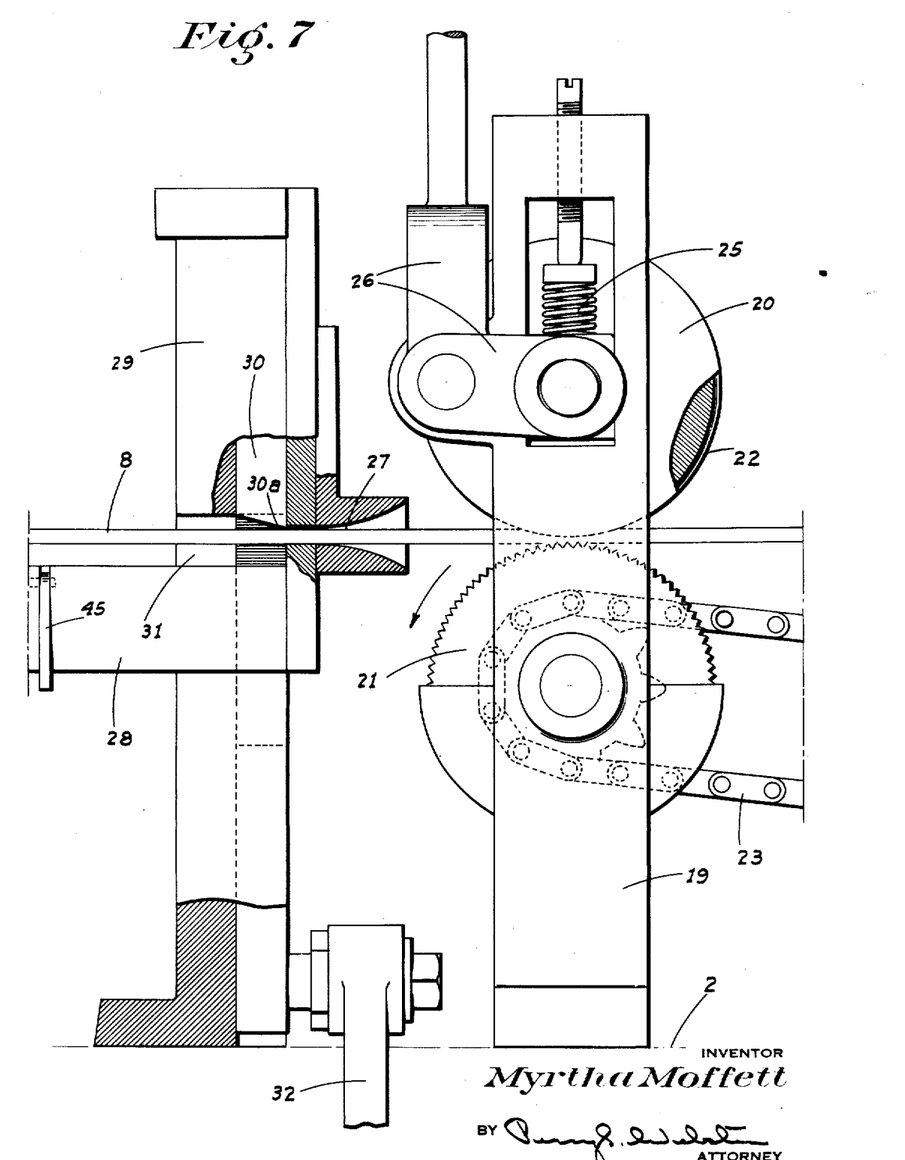
Figure 7 is a side elevation partly in section showing the wire feeding means and the shearing plunger.

The wire is fed into position on the plates 4 and cut to proper length before being thus fed by the following means:

Disposed beyond the frame 3 in the direction from which the wire is fed and upstanding from the base plate 2 is a support 19 on which are turnably mounted upper and lower rollers 20 and 21. The upper roller is circumferentially grooved as at 22 to guidingly engage the wire 8 leading from a suitable source of supply ahead of the machine; while the lower roller 21 is toothed or knurled to frictionally engage and feed the wire upward. The roller 21 is driven at a suitable speed by a chain or other drive connection 23 from a shaft 24 mounted above the plate 2 in front of the frame 3. This shaft is parallel to and is driven from the shaft 12a at the same speed in a direction such as to advance the wire toward said frame. The roller 20 is mounted for upward movement on its support 19, being yieldably pressed down by a spring 25. The roller is lifted when necessary to initially feed the wire between the rollers by a suitably arranged hand lever 26 applied to the shaft over said roller, as shown in Figure 7.

Figure 4:
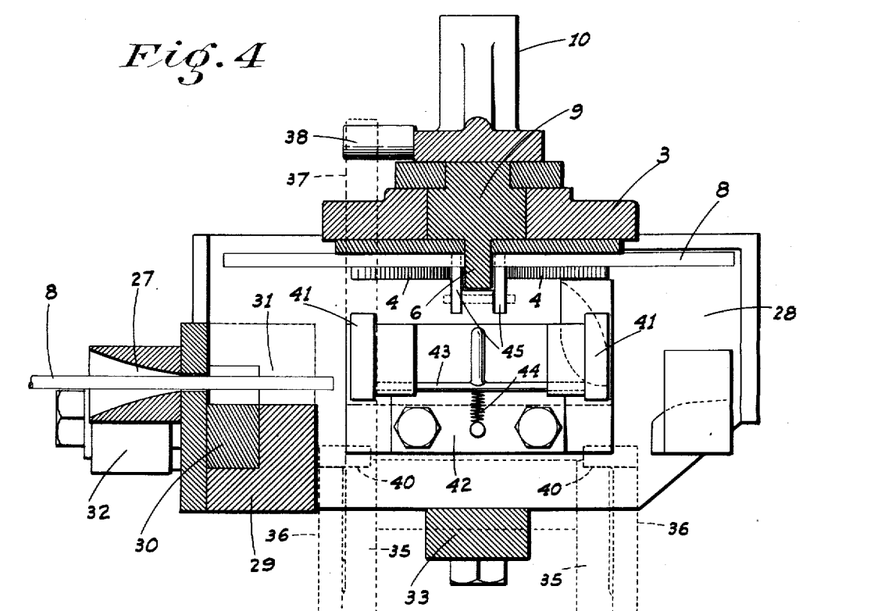
Figure 4 is a sectional plan substantially on the line 4—4 of Figure 3.

The rollers are positioned so that the wire is fed therebetween at a level adjacent that of the topmost stroke position of the plunger 6 and in a transverse plane in front of the frame 3. The wire then passes through the passage 27 of a guide thimble onto a platform 28 secured to and projecting forwardly from the frame 3. This platform is on a level with the topmost corners of the former guide plates 4 and abuts against the same, leaving a space between said plates and the adjacent face of the frame 3 for the downward passage of the wire as bent, as shown in Figure 4.

The thimble passage 27 projects toward the feed rollers from the adjacent wall of an upstanding guideway 29 in which a vertical shear plunger 30 is slidably mounted. The passage flares outwardly toward the feed rollers from a relatively restricted size at the inner face of said wall of the guideway. The plunger is recessed on one side intermediate its ends in facing relation to plate 3, the upper end of said recess forming the cutting edge 30a of the plunger to cooperate with the inner face of said wall of the guideway to shear the wire through as the plunger descends. The guideway also has a recess or opening 31 on the same side as the recess in the plunger and in facing relation to the frame 3, said opening extending forwardly from the cutting wall of the guideway and its bottom being on a level with the platform 28 with which it merges.

The plunger 30 is reciprocated from above the point of cutting to a very short distance below the same by a connecting rod 32 attached to its lower end and extending to a crank or eccentric connection with the shaft 12a. The speed of feeding of the wire, which is constant, is so coordinated with the speed of the stroke of the shear plunger that a sufficient length of wire for a staple will be fed onto the platform between each shearing stroke of the plunger. Also the point of shearing relative to the plates 4 is such that the center of length of a piece of wire as sheared off will be disposed in a plane substantially central of the space between said plates 4.

The wire as sheared immediately drops onto the platform 28 and the plunger also almost immediately starts on its upward stroke out of the way of the wire advancing from the supply. The length of cut wire is then pushed transversely of the platform onto the plates 4 by the following means:

Pivoted on a support 33 upstanding from the side of the platform 28 opposite the frame 3 is a longitudinally extending horizontal shaft 34 on the ends of which fixed depending arms 35 are mounted. Pivoted on the lower ends of these arms are substantially horizontal fingers 36 whose lower ends rest on the platform normally in front of the length of wire as sheared off. The shaft 34 is then limited in a direction to cause the fingers to move across the platform and push the wire into place on the plates 4 by means of an arm 37 secured to said shaft 34. This arm projects across the platform from said shaft to one side of the upper portion of the frame 3 and the cross head 9 in position to be engaged and raised by a lug 38 projecting from said cross head as the latter is on its up stroke. The lug is positioned so that the wire moves onto the plates 4 as the bottom of the plunger 6 reaches the top of its stroke or is above the position occupied by the wire.

When the lug 38 moves from under the arm 37 with the downward stroke of the plunger 6, the fingers are retracted across the platform ready to push the next length of wire, by a spring 39 between the arm 37 and the support 33. With the retracting movement of the fingers they are lifted clear of the platform so as not to interfere with the next length of wire now being fed onto the plate. This is done by means of lugs 40 projecting laterally from the tops of the fingers. On the advancing stroke of the fingers these lugs move under and deflect lifting cams 41. These cams are pivoted on and beyond the ends of a block unit 42 upstanding from the platform 28, the wire passing under said unit which is open on the side facing the frame 3 so as not to interfere with either the longitudinal or transverse movement of the wire.

Figures 5, 8:
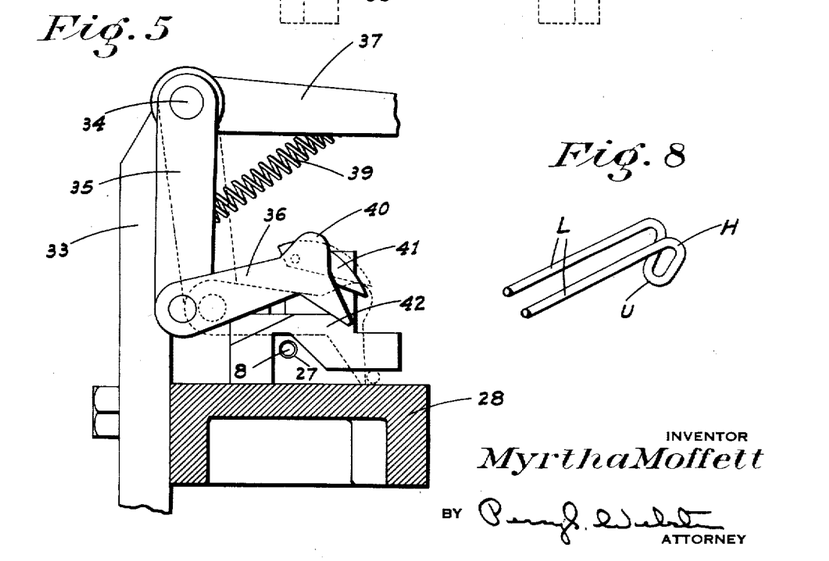
Figure 5 is a fragmentary side elevation of the wire pivoting unit, showing the pivoting fingers as raised when being retracted.
Figure 8 is a perspective view of a finished staple.

The cams extend transversely of the platform and are pivoted at their end furthest from the frame 3, the under faces of said cams having a downward slope toward their opposite end so as to be lifted by the lugs 40 only at said end as indicated in dotted lines in Figure 5. The pivotal shaft 43 of the cams is rigid with both, and is acted on by a spring 44 to yieldably hold said opposite ends of the cams down. As the finger lugs 40 pass beyond the cams as the fingers reach the advanced end of their stroke and release the cams, the adjacent ends of the latter which are wedge shaped, return to a level below that of the under side of the finger lugs. When the spring 39 pulls the fingers on the back stroke therefore the finger lugs then engage the upper surfaces of the cams at their adjacent ends and as they move back the fingers are lifted so as to ride on the cams and clear of the wire on the platform, as shown in Figure 5. When the finger lugs finally clear the cams the fingers are in front of the wire on the platform and drop of their own weight onto the platform in position for the succeeding wire advancing or pushing stroke.

Figure 3:
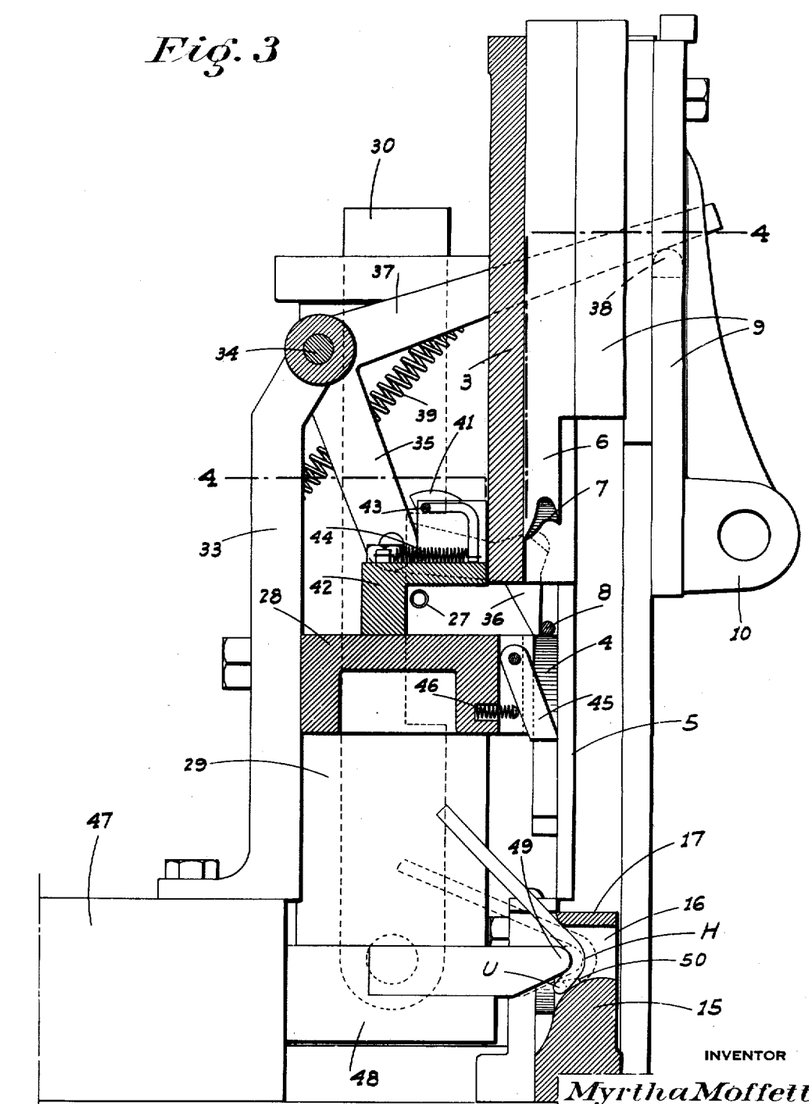
Figure 3 is a transverse fragmentary section of the same parts of the machine as in Figure 2, showing the hook forming plunger advancing and functioning.

When the wire 8 is pressed down and bent to its initial U-shaped staple form by the plunger 6 as previously described, it is prevented from upward movement by a pair of spring pressed pawls 45 (see Figures 2, 3 and 4). These are pivotally mounted at their upper ends in transverse recesses in the platform 28 in depending relation therefrom between the adjacent faces of the plates 4 and in line with the staple legs L as formed. Springs 46 behind the pawls tend to force their lower ends toward the adjacent face of the frame 3. Thus the wire may deflect and pass by the pawls as said wire is being depressed and bent, but when the staple is in its lowest position and is resting on the cradle 18, the pawls move out across the path of the staple legs slightly above the same, as shown in Figure 2, preventing any appreciable upward movement of the staple from position on the cradle.

The lower end of the staple when in this position is given the necessary additional transverse or hooked bend to complete the staple by the following means:

Mounted on the plate 2 is a horizontal slide block 47, extending at right angles to the plate 3 and in central transverse alignment with the plunger 6 and the staple formed thereby. A staple bending plunger 48 having a round-ended projecting nose 49 on its end facing the frame 3 and abutment 15, is slidably mounted in the block 47. This nose is at a level intermediate the top of the abutment 15 and the stop plate or abutment 17, and the curvature of the nose is such as to form a bend or hook of the desired curvature in the staple.

Figure 1:
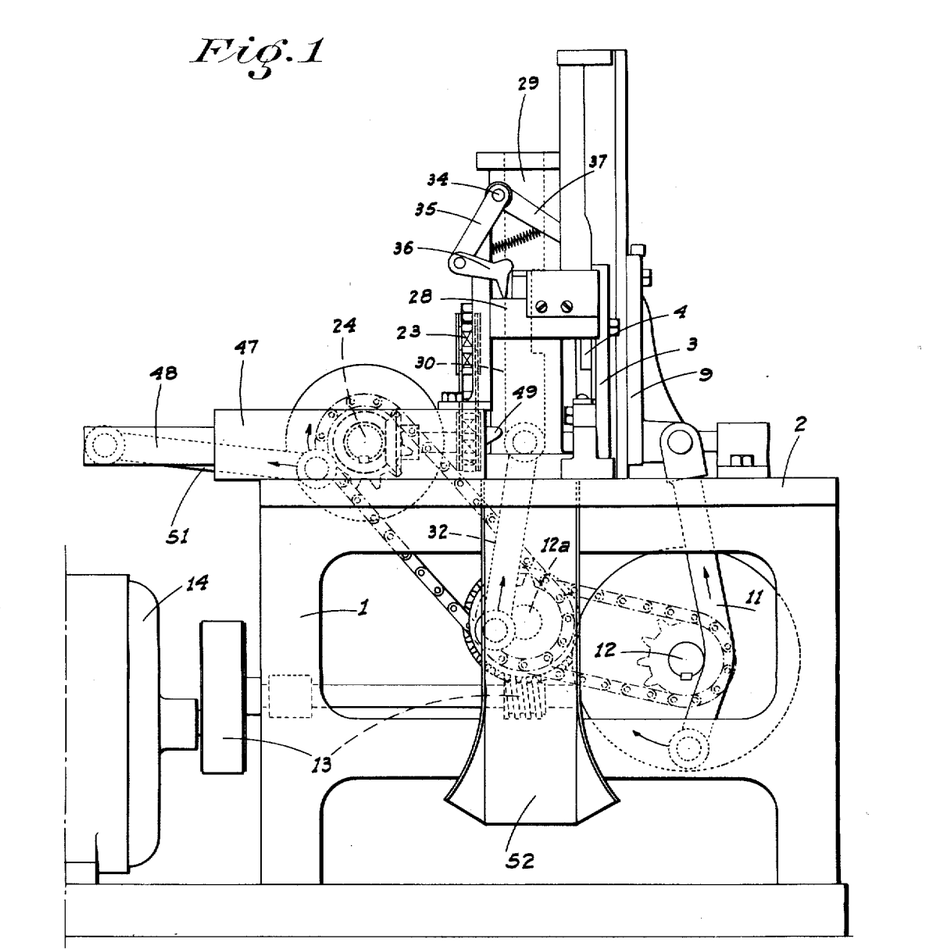
Figure 1 is an end view of the machine showing the position of the parts when the initial wire bending plunger is at the bottom of its stroke, or when such bending operation is complete.

By means of this construction it will be seen that when the plunger 48 is advanced into the opening 16 against the legs of a staple standing erect on the cradle 18 with the adjacent portions of said legs extending vertically across the opening 16 as in Figure 2, the staple must perforce bend between the plate 17 and the abutment 15, to form the hook H, as shown in Figure 3. As the staple is thus bent into the opening the inward movement of the same at its lower end or at the bend U, is limited by the engagement of the staple at the middle of said bend U by a stop pin 50 upstanding from the abutment 15, as shown in Figure 2. The plunger 48 is reciprocated through a stroke of the necessary length by a connecting rod 51 pivoted thereto adjacent its outer end and operatively connected to the shaft 24 in crank relation therewith, as indicated in Figure 1.

With the last named bending of the staple, as above described, the legs of the staple previously held in frictional contact with the adjacent sides of the plates 4 are moved clear of the same and as the plunger 48 moves away from the staple, said staple being overbalanced at its upper end, drops of itself into a discharge chute 52 depending from the plate 2, and from which the finished staples are discharged in suitable receptacles.

The various plungers are so coordinated in their movements that the shearing of a fed length of wire, its movement into position on the plates 4, its depressing and initial bending by the plunger 6, and the final bending by the plunger 48 take place in the order given, and in quick succession so that there is no possibility of any plunger or other parts conflicting in their movements with each other in any way to interfere with the free movements of the wire or of the staples being formed. At the same time the arrangement permits of very fast operation of the various plungers and a very large output of the finished products is possible.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A machine to form staples of hook-shaped form from lengths of wire comprising means to bend each piece to a U shaped form, means included in part with said first named means to temporarily hold the bent wire against movement, and means to then simultaneously engage both legs of the held U shaped wire adjacent its bent end to bend said legs so that the adjacent end portion of the wire is disposed at an acute angle to the major portion of the legs.

2. A machine to form staples of hook-shaped form from lengths of wire comprising means including a reciprocating plunger to engage each piece intermediate its ends and bend the same to a U shaped form, another reciprocating plunger disposed at right angles to the first plunger and movable transversely of the plane of the legs of the U shaped wire in position to engage both legs simultaneously adjacent the bend thereof, spaced abutments leaving an opening therebetween, positioned behind the U shaped wire with respect to the direction of advance of the second plunger to engage said wire at the bend thereof and also a predetermined distance beyond said bend, and means to advance the second plunger a predetermined distance into the opening.

3. A machine to form staples of hook-shaped form from lengths of wire comprising means to initially support each length of wire horizontally, a vertical plate disposed parallel to the supported wire and extending below the supporting means, means mounted in connection with said plate and including a vertical reciprocating plunger to depress each length of supported wire to a position below the support while bending the wire to a U shaped form, means on the plate to then releasably support the bent wire, and means then acting on the supported and bent wire to bend a hook in the same adjacent its initially bent end.

4. A machine to form staples of hook-shaped form from lengths of wire comprising means to initially support each length of wire horizontally, a vertical plate disposed parallel to the supported wire and extending below the supporting means, means mounted in connection with said plate and including a vertical reciprocating plunger to depress each length of supported wire to a position below the support while bending the wire to a U shaped form, means on the plate to then releasably support the bent wire, a horizontal reciprocating plunger extending at right angles to and away from the plate positioned to engage both legs of the bent wire adjacent the bend thereof, abutments on the plate immediately behind the bent wire to engage the same at the bend and just above the plane of the horizontal plunger, said abutments leaving an opening therebetween across which the adjacent portion of which the legs of the bent wire extend, and means to reciprocate the horizontal plunger so that its advanced end will enter the opening a predetermined distance.

5. A structure as in claim 2, in which the surface of the lower abutment is formed with an upward convex curvature away from the wire, and an upstanding pin on said surface in position to engage the wire at its initial bend and limit the movement of said bend on the abutment and into the opening as the horizontal plunger advances into said opening.

6. A machine to form staples from an initially continuous wire comprising wire feeding means, a horizontal fixed platform onto which the wire is fed, means to cut the wire as fed into pieces of predetermined length, means to move each cut length of wire transversely a certain distance, means including a vertical plunger mounted in position to engage said moved length of wire intermediate its ends and depress the same relative to the platform while bending said wire to a U shaped form, means to reciprocate the plunger from a point above to a point below the platform, and means controlled by the movement of the plunger to actuate said wire moving means in predetermined coordinated relation to the movement of the plunger.

7. A machine to form staples from an initially continuous wire comprising wire feeding means, a horizontal fixed platform onto which the wire is fed, means to cut the wire as fed into pieces of predetermined length, means to move each cut length of wire transversely a certain distance, means including a vertical plunger mounted in position to engage said moved length of wire intermediate its ends and depress the same relative to the platform while bending said wire to a U shaped form, means to reciprocate the plunger from a point above to a point below the platform, and means to actuate said wire moving means so as to shift the wire in position to be engaged by the plunger when the latter has moved above the platform.

8. A machine to form staples from an initially continuous wire comprising wire feeding means, a horizontal fixed platform onto which the wire is fed, means to cut the wire as fed into pieces of predetermined length, a vertical plunger disposed to one side of the cut wire in a plane intermediate its ends, means to reciprocate the plunger from a point above to a point below the platform, wire guiding plates depending from the platform in spaced relation on opposite sides of and in the same transverse plane as the plunger, the upper faces of the plates curving down in converging relation to each other from the level of the platform, and means to move the cut wire transversely of the platform and onto said plates while the plunger is above the platform.

9. A structure as in claim 8, in which said last named means includes fingers riding on the platform to engage the cut wire intermediate its ends and on the side thereof furthest from the plates.

10. A machine to form staples from an initially continuous wire comprising wire feeding means, a horizontal fixed platform onto which the wire is fed, means to cut the wire as fed into pieces of predetermined length, means including a vertical plunger disposed to one side of the cut wire to depress said wire and bend the same to a U shaped form, fingers riding on the platform to engage the cut wire intermediate its ends and on the side thereof furthest from the plunger, and means to move said fingers across the platform to push the wire into a plunger engaging position.

11. A machine to form staples from an initially continuous wire comprising wire feeding means, a horizontal fixed platform onto which the wire is fed, means to cut the wire as fed into pieces of predetermined length, means including a vertical plunger disposed to one side of the cut wire to depress said wire and bend the same to a U shaped form, fingers riding on the platform to engage the cut wire intermediate its ends and on the side thereof furthest from the plunger, means to reciprocate the fingers across the platform to push the wire into a plunger engaging position during one stroke of the fingers, and means to lift the fingers clear of the platform during the retracting stroke thereof whereby to avoid contact with a subsequent length of wire being fed onto the platform.

12. A machine to form staples from an initially continuous wire comprising wire feeding means, a horizontal fixed platform onto which the wire is fed, means to cut the wire as fed into pieces of predetermined length, a vertical plunger disposed to one side of the cut wire in a plane intermediate its ends, means to reciprocate the plunger from a point above to a point below the platform, wire guiding plates depending from the platform in spaced relation on opposite sides of and in the same transverse plane as the plunger, the upper faces of the plates curving down in converging relation to each other from the level of the platform and the plunger being movable to a point below said curved faces whereby to cause the wire to be depressed and bent to a U shaped form with its legs engaging the sides of the plates below said curved faces, and means to shift the wire onto said plates while the plunger is above the platform.

13. A structure as in claim 12, with means yieldably engaging the legs of the bent wire after it has been depressed to its lowest position to prevent upward movement of the same with the upward movement of the plunger.

14. A structure as in claim 3, in which the supporting means is arranged to allow the formed staple to drop from position of itself when the hook has been formed therein and the last named bending means has been retracted.

15. A staple forming machine comprising alined horizontally spaced vertical plates, means to feed a straight length of wire to rest on the upper edges of the plates and so as to extend across the space therebetween, a reciprocating plunger to engage the wire between the plates and depress said wire so that it is transformed to a U shaped element with the legs engaging the adjacent vertical edges of the plates, and means mounted in connection with the plates to prevent upward movement of the element after the plunger has descended to the bottom of its stroke and with the upward movement of said plunger.

16. A staple forming machine comprising alined horizontally spaced vertical plates, means to feed a straight length of wire to rest on the upper edges of the plates and so as to extend across the space therebetween, a reciprocating plunger to engage the wire between the plates and depress said wire so that it is transformed to a U shaped element, with the legs engaging the adjacent vertical edges of the plates, pawls pivoted at their upper ends and to one side of the plates sloping downwardly into the path of movement of the legs of the element and positioned so that the lower ends of the pawls are just above the upper ends of said legs when the plunger is at the bottom of its stroke, and springs yieldably holding the pawls at such a downward slope.

17. A staple forming machine comprising alined and horizontally spaced vertical plates, means to feed a straight length of wire to rest on the upper edges of the plates and so as to extend across the space therebetween, a reciprocating plunger to engage the wire between the plates and depress said wire so that it is transformed to a U shaped element with the legs engaging the adjacent vertical edges of the plates, said wire being resilient whereby the legs as formed will frictionally engage the plates and hold the formed element in position, and means including a horizontal reciprocating plunger to engage both legs of the element simultaneously adjacent the bend thereof to form a hook in the element; the space between the plates for the height of the legs being unobstructed on the side facing said horizontal plunger for a horizontal distance substantially equal to the length of the legs and an abutment behind and engaging the legs of the element adjacent but above the plane of the hook whereby as the latter is formed, the legs will swing about said abutment and into the open space clear of the plates for discharge by gravity when the horizontal plunger is retracted from a hook forming position.

18. A machine to form staples from initially straight lengths of wire, comprising a horizontal platform to initially support each length of wire in a position parallel to one side thereof, horizontally spaced plates depending from the level of the platform on and abutting against said side thereof, means to shift the wire from the platform onto the upper edges of the plates across the space therebetween, and a vertical reciprocating plunger functioning in timed relation to the action of the shifting means to engage the wire and depress the same into said space.

19. A structure as in claim 18, in which said shifting means comprises horizontally spaced fingers resting at one end on the platform to engage the length of wire intermediate its ends and on the side thereof opposite the plates.

20. A machine to form staples from initially straight lengths of wire, comprising a horizontal platform to initially support each length of wire in a position parallel to one side thereof, horizontally spaced plates depending from the level of the platform on and abutting against said side thereof, means to shift the wire from the platform onto the upper edges of the plates across the space therebetween, comprising horizontally spaced fingers above the platform to extending transversely of the platform, means to reciprocate the fingers comprising arms pivoted on the ends of the fingers at the end thereof furthest from the plates, the free end of the fingers being adapted to engage the length of wire on the platform on the side thereof opposite the plates, means to reciprocate the fingers, means cooperating with the fingers to allow them to rest on the platform during the movement of the fingers toward the plates but holding the fingers clear of the platform during the movement of the fingers in the opposite direction, and means to engage a wire resting on the plates and depress the same into the space therebetween.

21. A structure as in claim 20 in which said finger cooperating means comprises cams pivoted above the platform at their end opposite the plates and extending with a downward slope toward the same to a termination clear of the platform, said cams being disposed parallel to the fingers to one side of the same, and lugs projecting from the fingers in position to project under the cams and lift the same with the movement of the fingers toward the plates and to then pass in front of the free end of the cams whereby the latter may drop to their normal position to engage the lugs on their upper surface with the retractive movement of the fingers so that the latter are then clear of the platform.

MYRTHA MOFFETT.